United States Patent [19]
Harrington et al.

[11] Patent Number: 5,995,716
[45] Date of Patent: Nov. 30, 1999

[54] SYSTEM FOR ORGANIZING CODES REPRESENTING SELECTABLE COLORS IN A DIGITAL PRINTING APPARATUS

[75] Inventors: Steven J. Harrington; R. Victor Klassen, both of Webster; Stephen C. Morgana, Brockport, all of N.Y.

[73] Assignee: Xerox Corporation, Stamford, Conn.

[21] Appl. No.: 08/786,467

[22] Filed: Jan. 21, 1997

[51] Int. Cl.⁶ .................................................. H03M 7/00
[52] U.S. Cl. ........................ 395/109; 341/81; 358/523
[58] Field of Search ..................... 395/109, 600; 358/444, 518, 523; 707/200; 382/162, 167; 341/52, 79, 81

[56] References Cited

U.S. PATENT DOCUMENTS

| | | |
|---|---|---|
| 5,087,965 | 2/1992 | Torre-Bueno ............................ 358/22 |
| 5,276,532 | 1/1994 | Harrington .............................. 358/444 |
| 5,319,779 | 6/1994 | Chang et al. ........................... 395/600 |
| 5,343,311 | 8/1994 | Morag et al. ........................... 358/518 |
| 5,517,334 | 5/1996 | Morag et al. ........................... 358/518 |
| 5,619,591 | 4/1997 | Tsang et al. ........................... 382/166 |
| 5,867,145 | 2/1999 | Beheler .................................. 345/153 |

*Primary Examiner*—Andrew W. Johns
*Attorney, Agent, or Firm*—R. Hutter

[57] ABSTRACT

In a color-management system, such as for a color digital printer, digital codes describing combinations of two colors are retained in a specific format. The three primary-color stimuli forming each color of the color pair are described as binary numbers, and the binary numbers are combined to yield a single orderable number. With this format, codes describing color pairs can be readily retained in a searchable table, preferably an AVL-balanced tree.

19 Claims, 2 Drawing Sheets

SYSTEM FOR ORGANIZING CODES REPRESENTING SELECTABLE COLORS IN A DIGITAL PRINTING APPARATUS

CROSS-REFERENCE TO RELATED APPLICATION

Cross-reference is made to the following U.S. patent application: Ser. No. 08/439,266, filed May 11, 1995 now U.S. Pat. No. 5,682,249.

FIELD OF THE INVENTION

The present invention relates to digital printing systems for printing color images. More specifically, the present invention relates to a technique for maintaining a table of digital codes, each code comprising data describing one or more distinct colors to be printed or otherwise displayed by the apparatus.

BACKGROUND OF THE INVENTION

U.S. patent Ser. No. 08/439,266 now U.S. Pat. No. 5,682,249, describes a system for managing colors in a relatively "low-end" color digital printing apparatus, such as a laser printer or ink-jet printer, in which color images are derived from digital data. Because of the memory constraints in certain types of printers, it is not always possible to provide a system whereby specific desired colors can simply be called forth on demand. Rather, the system described in the above-referenced patent relies on a dynamic "color table". The color table is a relatively small list of digital (typically 32-bit) codes, each code describing one particular color. In order to describe a particular color, the code must contain groups of digits, which are assigned to, typically, one of three possible "stimuli." Thus, to take the example of describing colors in RGB space, each code or part of a code describing one color will include, in a predetermined order, bits describing the amount of red, bits describing the amount of green, and bits describing the amount of blue necessary to obtain the desired color.

In the patent application referenced above, a special arrangement is described whereby a square array of 16 pixels in an image desired to be printed is compressed into a 32-bit block description. In one embodiment, different conventions exist for describing different types of images within each 16-pixel block. For example, if a particular 16-pixel block from the image contains pixels of one uniform color, the 32-bit block description will be of one particular format. If, however, the 16-pixel array includes pixels of two colors (such as if the pixels describe the border of one graphic next to another), a special format is used for the 32-bit block description: the first 4 bits are used to identify the block description as being of this two-color format; the next 12 bits are an index reference to a color table, such as will be described below; and the final 16 bits describe the relative position of colors in the 16-bit pixel array, with, for example, a 0 bit indicating that a first color is assigned to a particular pixel, and a 1 indicating that a second color is assigned to a particular pixel. With reference to the 12-bit index describing a color pair in the 32-bit block description, the 12 bits form a number which can refer to the external color table. The color table is a list of pairs of codes, each code describing the stimuli required to obtain a particular color.

DESCRIPTION OF THE PRIOR ART

In the prior art, U.S. Pat. No. 5,276,532 discloses a general method to reduce the amount of memory required to construct a full-color page image for printing. This method discloses a single, split-level frame buffer for retaining information regarding individual pixels in a page image desired to be printed.

U.S. Pat. No. 5,319,779 discloses the use of "AVL balanced trees" to retain certain types of data in tables that can be accessed at high speed.

Wirth, *Algorithms+Data Structures=Programs*, (Englewood Cliffs, N.J.: Prentice-Hall, 1976), pp. 215–229, demonstrates both the basic theory of, and a practical embodiment of, an AVL balanced tree to construct a data structure.

SUMMARY OF THE INVENTION

According to one aspect of the present invention, there is provided, in an apparatus for displaying a plurality of selectable colors, each selectable color comprising at least one of a plurality of color stimuli, a method of managing a list of color codes, each color code comprising information relating to the plurality of color stimuli for at least one selectable color. A plurality of stimuli describing at least a first color is obtained, each stimulus being in the form of a binary number. The binary numbers of the plurality of stimuli are arranged so that digits of equal significance for the plurality of stimuli are grouped together, thereby creating a single binary number forming a color code. The color code is retained in numerical order relative to other color codes.

According to another aspect of the present invention, there is provided a method of managing a color table, the color table comprising a plurality of color codes, each color code including information relating to a plurality of stimuli describing at least two colors. A plurality of stimuli describing a first color is obtained, each of said stimuli in the form of a binary number. A plurality of stimuli describing a second color is obtained, each of said stimuli in the form of a binary number. The stimuli describing the first color are combined with the stimuli describing the second color, to yield a color code. The color codes are retained in numerical order.

As used in the specification and claims herein, a "stimulus" is a scalar value relating to the amount of a particular primary color required to create a particular color; the reason the word "stimulus" is used is that different systems may use different, or multiple, color spaces, depending on whether the image is finally to be printed or otherwise displayed, such as on a screen. In an "RGB" color space, for example, the stimuli are the relative amounts of red, green, and blue required to create a particular desired color; in CMY color space, the stimuli relate to the amounts of cyan, magenta, and yellow to obtain the desired color. Physically these stimuli can relate to the density of toner or ink in a printed image, or the amount of energy applied to a light-emitting structure in a CRT or flat-panel display. Other, device-independent color spaces can be described as sets of stimuli as well.

DETAILED DESCRIPTION OF THE INVENTION

Figure 1:
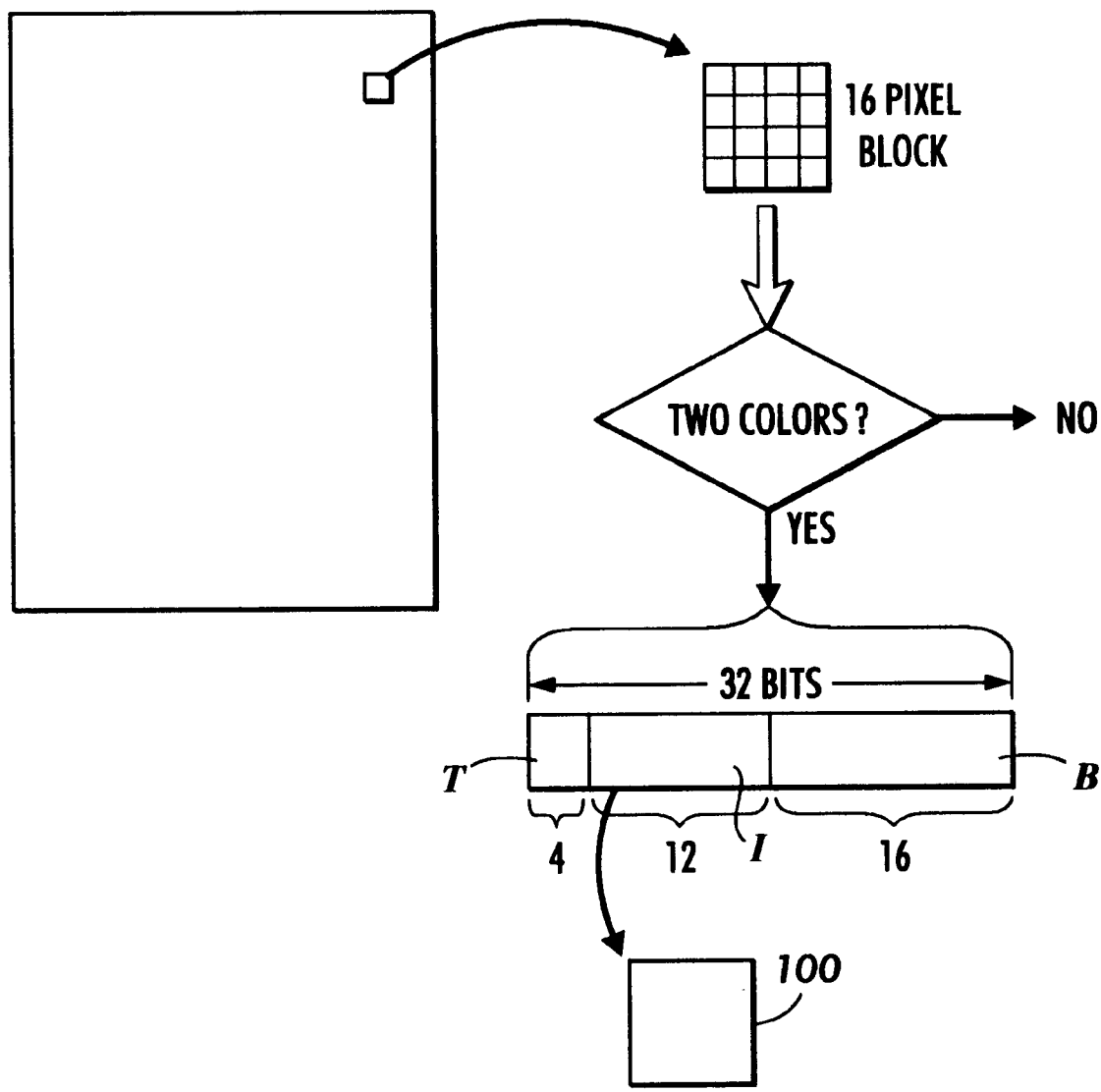
FIG. 1 is a diagram illustrating a process for encoding blocks of image data, in which the method of the present invention would be useful.

FIG. 1 is a diagram showing the basic steps of an image-encoding process in which the method of the present invention would be useful. A full-color image desired to be printed is retained as pixel data in a frame buffer, which typically exists within a decomposer, such as for interpreting page description languages which describe basic images (e.g., fonts and geometric figures) to be printed. As shown in FIG. 1, the image data is processed as a series of 4×4=16 pixel blocks. For purposes of the present embodiment of the invention, what is of most interest is situations in which two identifiable colors are present within a 16-pixel block; according to preferred embodiments of the present invention, if a particular 16-pixel block includes only one color, or more than two colors, other encoding techniques may be employed other than what is here described in detail.

Further shown in FIG. 1 is a sample representation of a 32-bit block description which is derived from a 16-pixel block bearing two distinct colors. For each 32-bit block description, the first 4 bits, indicated as tag T, contain a special leading set of bits that indicate that this particular set of 32 bits represent a 16-pixel block of the two-color type. The following 12 bits, indicated as index bits I, are bit-places for a number which will used to refer to a color table, which includes a list of selectable pairs of distinct colors, as will be described in detail below. The final 16 bits of the block description, indicated as bitmap B, represent where the two colors are to be placed within the 16-pixel block when the image is reconstructed; typically a 0 in a particular position in bitmap B indicates that a first color referenced by index bits I is to be placed in those pixels, while a 1 in a particular position indicates that a second color is to be placed in the corresponding pixel position.

Returning now to index bits 1, these bits can hold a binary number from 0 to 4095 decimal. In practical terms, this means that index bits I can refer to one of over 4,000 possible pairs of colors. In order to convert a number referenced in a particular set of index bits I for a particular 32-bit encoding, the preferred embodiment of the present invention provides for a "color table," which enables a set of index bits to be cross-referenced to one of a large number of selectable "color codes."

This is an example of how a table containing pairs of colors can be used in a representation of an image with reduced storage requirements over the conventional practice of storing a separate color value at each pixel. However, for a color-pair table to be of use in such an application it must have certain properties. First, it must be of a fixed and limited size. A large table defeats the purpose of the image representation, which is to reduce the storage requirements. Further the table size may be limited by the number of bits available for addressing it in the data element for the block (only 12 bits of the 32 of the block are available in the above example.)

Second, the system must be able to insert new color-pair elements into the table as the image is received. The system has no prior knowledge of what color pairs will be needed for an image. Nor is there any storage for the image other than for the compressed form which relies on the color table. Thus, as the image is received or constructed, it must be encoded using the color table and the appropriate color pairs must be entered "on-the-fly."

Third, the system must be able to determine quickly whether a code describing a color pair is in the table, and if so, locate that code in the table. The value of using a table is that it takes less storage to hold a table index than a pair of color values, so a color pair can be entered only once, and all blocks that use that color pair need only specify its table index. This can only be done if the system can locate that pair and its index.

Fourth, the system must be able to locate color pairs with values that are close to, but not necessarily identical to the desired pair. Because the table is limited in size, it is likely to have insufficient space to store every color pair that occurs in a complex image. To overcome this problem one can allow small errors in the image by referencing a color pair from the table that is close to the desired value, rather than requiring an exact match. To support this the system must be able to find the entries in the table that have values close to those desired.

Finally the system must be able to consolidate the table by combining and removing entries. As the image is created or received, entries are added as needed to the table. However, since the table is limited in size it must support some strategy for dealing with the problem of overflow, that is of having more entries than the table can hold. A strategy for dealing with this is to allow greater errors between the ideal color pair and the pair referenced from the table. This means that fewer table entries will be needed and entries can be removed, freeing space for further additions. The system must be able to find entries with values close enough to combine and to remove entries that are freed by this process.

The tasks of locating desired entries, locating entries close to the desired value and finding entries that can be combined are greatly facilitated by defining an ordering code for the color pairs. This ordering code allows sorting of the table entries and fast searching for the desired color pair. The ordering code should be such that similar color pairs have nearby codes.

According to the present invention, color codes are unique binary numbers, each color code describing at least one color. To describe a single color, the color is described as a set of scalar values, each value being descriptive of one primary color "stimulus" required to obtain the desired color. For example, to describe an individual color in RGB color space will require values for the red, green, and blue components for that desired color. If each scalar value for the red, green, and blue primary colors is in the form of an 8-bit binary number, according to a preferred embodiment of the present invention the color code describing that single color will have the bits thereof interleaved to obtain a bit format of $$G_7 R_7 B_7 G_6 R_6 B_6 \ldots G_1 R_1 B_1 G_0 R_0 B_0$$

Where $G_7$, for example, represents the most significant bit for the binary number describing the green component, $R_7$ is the most significant bit describing the red component, etc., down to $G_0$ $R_0$ $B_0$, being the least significant bits describing the green, red, and blue components, respectively. Also, although stimuli in RGB space are represented, it will be apparent that the same interleaving principle can be applied to CMY signals, or device-independent signals such as CIE L*a*b*.

According to this scheme, a color to be printed, broken down into its RGB stimulus components and encoded, will yield a 24-bit binary number. The fact that the bit places within a single color code are grouped from most significant bit to least significant bit, and also with the green bit always preceding the red bit and the red bit preceding the blue bit, enables a large number of such codes to be placed in numerical order. When a number of codes describing various colors are assembled in numerical order, the nature of the bit sequence is such that nearby colors in color space will be nearby in numerical order. In other words, when a large number of such codes are assembled in a list, an algorithm for finding a particular desired color will be able to go to a "neighborhood" of similar colors within the list and then chose the closest color to what is desired.

(In the here-described embodiment, the 8-bit binary numbers for each stimulus are "interleaved" on a one-bit-by-one-bit basis; an alternate embodiment could provide, for example, interleaving the binary numbers two bits at a time, e.g. $G_7G_6R_7R_6B_7B_6G_5G_4R_5R_4B_5B_4\ldots$. What is important for "interleaving" is the digits forming each stimulus are grouped together in a consistent way to form the complete color code as a single orderable number.)

In the RGB color space, it is significant that for every triplet of same-significance bits in a particular code, the particular bit corresponding to the blue stimuli is placed in a less significant position than the same-significance green or red bit. This arrangement is desirable because the eye tends to be less sensitive to subtle changes in the amount of blue stimulus relative to green or red. A similar principle could be applied to interleaving bits for CMY or other stimuli.

What has just been described is an encoding method for describing the stimuli forming a single selectable color. As mentioned above, however, what is of interest in the FIG. 1 embodiment are codes describing pairs of selectable colors. According to one embodiment of the present invention, a color code describing the RGB stimuli of two distinct colors A and B would be constructed as:

$$G^A_7 G^B_7 R^A_7 R^B_7 B^A_7 B^B_7 G^A_6 G^B_6 R^A_6 \ldots B^B_1 G^A_0 G^B_0 R^A_0 R^B_0 B^A_0 B^B_0$$

Here, as can be seen, not only are the bits describing the individual stimuli of each color organized as in the one-color case above, but the bits for the two different colors are then interleaved with each other. The color codes can be constructed in similar fashion for groups of three or more colors.

With the bits describing the stimuli of the two different colors organized in the above manner, when a large number of such color codes are assembled in numerical order in a list, it will be apparent that the basic "neighborhood" principle still applies. Any particular two-color color code in numerical order relative to other color codes will "neighbor" the visually closest available color pairs. Therefore, if one is searching through a large sorted list of color codes for a particular desired pair of colors, one may search in the appropriate "neighborhood" of close color pairs to find the best match.

As used in the claims herein, the stimuli for each color A and B (or more) are in the form of binary numbers which are broadly "combined" to yield a color code. Although the above-described technique of interleaving the binary digit for each primary-color stimulus of two colors provides many practical advantages in maintaining a set of orderable color codes, other techniques for combining stimuli of two or more colors to obtain a color code are possible. Within the context of the preferred embodiment of the present invention, what is important is that the encoding technique result in single orderable numbers, each orderable number describing two or more unrelated colors.

One simple alternate method of obtaining orderable two-color color codes would be to concatenate the binary numbers describing each color stimulus for the first and second colors, e.g.:

$$G^A_7 G^A_6 G^A_5 \ldots G^A_0 G^B_7 G^B_6 \ldots G^B_0 R^A_7 R^A_6 \ldots R^A_0 R^B_6 \ldots$$
$$R^A_0 R^B_7 R^{B6} \ldots R^B_0 B^A_7 B^A_6 \ldots B^A_0 B^B_7 B^B_6 \ldots B^B_0$$

In the above example, blocks of one byte for each primary-color stimulus for the first and second colors A and B are simply concatenated without the interleaving of similar-significance bits.

It is also possible to obtain orderable color codes while using only a subset of the binary digits for each primary-color stimulus for each color. Typically, the subset would be the four or two highest-order binary digits for each stimulus for each color, such as in the following example, where only the two highest-order binary digits for each primary-color stimulus of colors A and B are used:

$$G^A_7 G^A_6 G^B_7 G^B_6 R^A_7 R^A_6 R^B_7 R^B_6 B^A_7 B^A_6 B^B_7 B^B_6$$

It will be noted that use of high-significance binary digits only enables relatively short color codes, which may have still have sufficient resolution for purposes of searching through an ordered list of color codes for close color pairs. It is further conceivable that a color code could include, for example, two bits of green stimuli for each color and only one bit of the red or blue stimuli for each color, if it were decided that the green stimulus was more important for high-resolution searching through a set of color codes than red or blue. (Use of subsets of binary digits for each stimulus for each color can also be used in the bit-interleaving context, described above.)

Another general technique which could be used to obtain orderable color codes would be to use an arithmetic function, such as a weighted value for each color A and color B, the weighting being a function of which primary color is deemed most important for searching purposes. Thus a single color having the stimuli GRB (i.e., three numbers, one for each stimulus) could be converted to a single orderable number derived from xG+yR+zB, where x+y+z=1. The weighting values x,y,z could be selected as a function of which primary color is deemed to require the most precision in finding a close match when a color table is searched; as mentioned above, the primary color which typically requires the most precise matching in this context is usually green. To obtain a two-color color code using such weighted values, the two color codes could themselves be summed or averaged together, or turned into binary numbers and concatenated or interleaved.

Yet another alternate technique for developing a table of color codes is "hash coding." Hash coding is a common technique that is use for storing and retrieving a few elements by codes from a potentially large code space. The idea is to convert the code for the item into a smaller index value. Usually the hashing function chops up and mixes the code to try to spread a sequence of codes over a variety of indices. One might, for example, truncate the codes for each stimulus to some significant number of bits, concatenate these bits for a color value, reverse the bit order to distribute the indices, and use an exclusive-OR logical operation to combine the results for several colors into a single index. When hashing is used, neighboring colors will, in general, not have similar indices; however, neighboring colors can be located by calculating their hashed index and checking for the existence of an entry in the table.

It will be apparent that combinations of table look-up, hashing, arithmetic and bit-manipulation (interleaving or concatenation) operations could be used to obtain color codes, each describing two or more colors.

If the two-color color codes are organized in one of the above-described manners, and many selectable color codes are organized in numerical order in a color table, it becomes apparent how a binary number described by index bits I in a 32-bit block description as in FIG. 1 can be applied to find a best-fit pair of colors from a color table, a color table being an ordered list of color codes.

Figure 2:
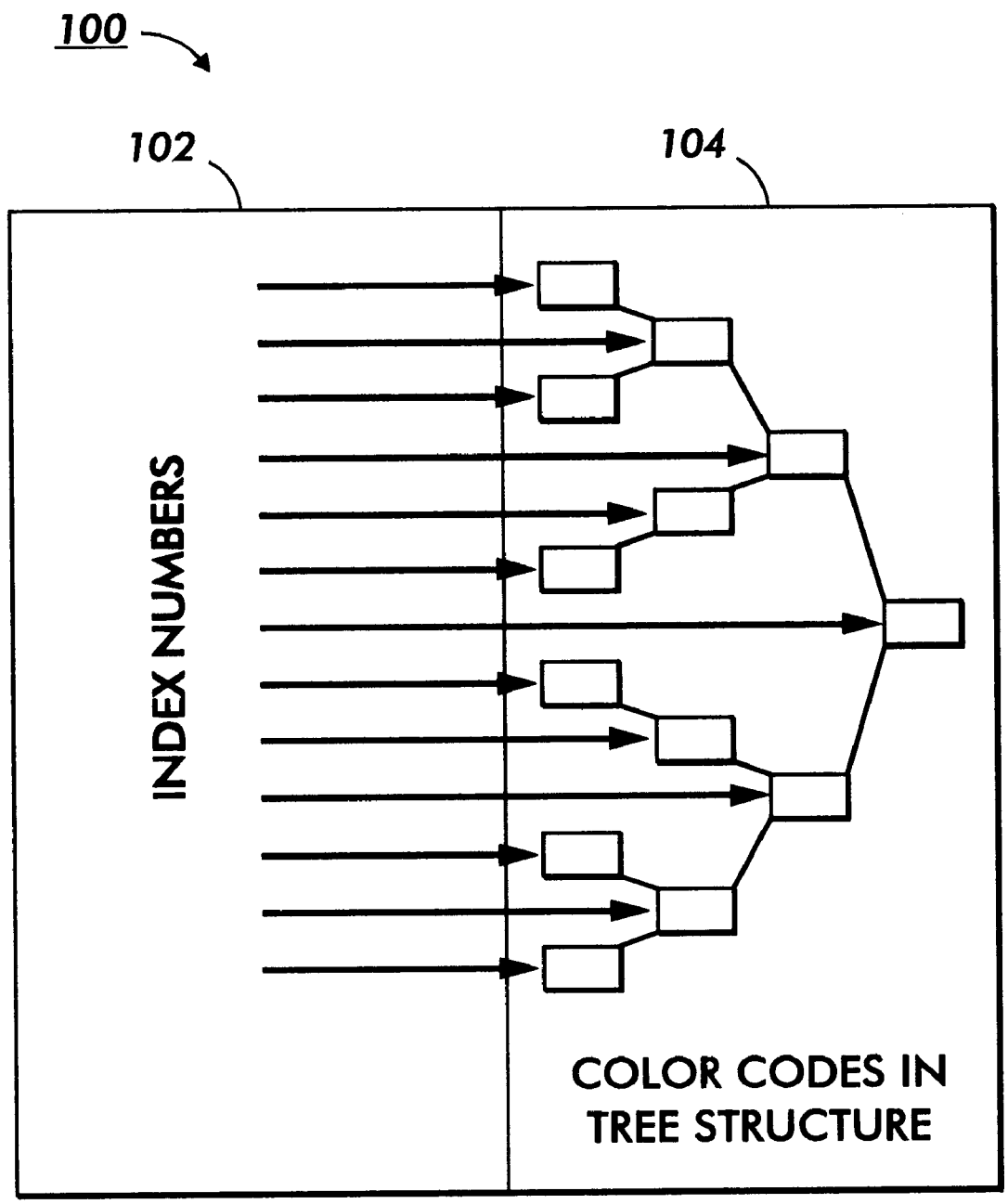
FIG. 2 is a diagram showing the elements of a color table, according to the present invention.

FIG. 2 is a conceptual diagram showing the essential attributes of the preferred embodiment of a color table, generally indicated as 100, according to one aspect of the present invention. A list of index numbers, indicated as 102, comprises numbers which correspond to the index bits I in each encoded block, as shown in FIG. 1 above. That is, each 32-bit block description derived from a 16-pixel block in the original image includes 12 index bits 1, and every individual 12-bit binary number that could be used as the index bits I will have a counterpart in the list of index numbers 102. The index numbers in list 102 each correspond on a one-to-one basis with nodes in a threaded, AVL-balanced tree indicated as 104.

According to a preferred embodiment of the invention, color codes 104 are organized in a "threaded" tree, which can be developed through known algorithms. In a threaded tree, although different color codes may be located at different levels (branches or leaves) of the tree, a software "thread" is provided which enables the various color codes to be maintained in a numerical order, even if a numerically next color code is not a leaf of the tree, but rather a higher-level branch of the tree. Thus, if a search program follows the thread, the thread will point to a succession of color codes in order, even if the thread has to move "up" the tree (closer to the "trunk") or "down" the tree (closer to the "leaves") in different searching situations.

Further, the threaded tree 104 is preferably AVL-balanced. As described, for example, in the textbook by Wirth referenced above, an AVL tree such as 104 is a data structure which is "height balanced": a tree is considered height balanced if and only if for every node the heights of its two subtrees differ by at most 1. The advantage of using an AVL balanced tree is that such trees enable the nodes thereof to be searched, inserted and deleted at a reasonably high speed by well-known algorithms. In the case of the AVL tree 104 in the present invention, each node of the AVL tree represents a particular color code; that is, every node represents a color code that describes a distinct pair of colors, in the manner described above. Further according to the present invention, the AVL tree 104 provides a list of color codes which are in numerical order; as mentioned above, this numerical ordering of color codes enables searching of "neighborhoods" for approximate colors.

Significantly, whereas the color codes in AVL tree 104 are in numerical order and are therefore generally organized in neighborhoods of similar colors, the index number in list 102, each indexed number corresponding to one color code in AVL tree 104, need not be in any particular order. Indeed, according to one embodiment of the present invention, the index numbers in list 102, each of which will appear in one or another block description, are in no particular order relative to the numerical order of color codes in tree 104; rather, individual index numbers are created as particular color pairs are encountered in an original image being encoded. Because the index numbers are created in response to what is encountered in the image, there will be no relation between the order of index numbers in list 102 and the specific numerical order of color codes in tree 104, other than that the numbers in list 102 are used to identify or "index" color codes which are in numerical order along the thread in tree 104.

In one practical embodiment of a color look-up system utilizing the color pair coding scheme of the present invention, a color table having a large number of color codes is created "from scratch" with the encoding of every single image in a frame buffer; that is, if a page image having millions of pixels is to be encoded as a series of 16-pixel blocks as in FIG. 1, a color table is created as the page image is encoded. When encoding the blocks of a page image, every time a 16-pixel block having a particular two-color combination is encountered in the original image, a new color code describing that particular color pair is created and entered into the tree 104, and assigned an index number in list 102. If a subsequent 16-pixel block, having the same color pair therein, is encountered in the same image, that color code is referred to again by its assigned index number. Otherwise, if a particular color-pair combination is unprecedented in the page image as the color table 100 is created, the new color pair is entered into the tree 104 as a color code, and assigned a new index number for list 102. The general intention is that any typical page image that is to be encoded will require no more than a manageable number of these two-color color codes, a manageable number being less than about 4,000, that can be referenced by 12-bit binary numbers.

In managing a color table of selectable color codes which must necessarily be limited in size, the question therefore arises of when should a system managing the color table allow a new color pair to be entered into the color table and assigned a reference number, and when should a "close neighbor" color code, describing the pair of colors closest to the desired pair of colors but which is already in the color table, should be used.

As the color table fills up in the course of encoding a page image, inserting a new color code which happens to be between two pre-existing color codes in numerical order would require moving around large blocks of color code to accommodate new entries; one would like to avoid this costly operation. The data structure for retaining the color table must provide a mechanism for quickly locating the neighborhood of a desired color pair so that one can determine whether a sufficiently similar two-color color code already exists in the color table, or whether a new two-color color code must be added. Further, one must be able incrementally to add new color codes to the structure. The AVL tree 104 allows the search of an item from N entries in log N time. The search will locate the closest item code less than the desired code if the desired code is not present in the tree. One can incrementally add or delete items from the tree. Further, a threaded tree allows one to easily find the previous or next entries in numerical order, so that one can easily traverse the tree and examine neighborhoods of closely-related colors.

In the context of the preferred embodiment of the invention, when a particular color pair is encountered in a 16-pixel block from an image being encoded such as in FIG. 1, the process of encoding is as follows:

1. The two colors in the 16-pixel block are analyzed separately to obtain the relative values of color stimuli, such as RGB or CMY, to obtain the color, and a color code as of the above-described format, is derived.

2. The AVL tree 104 is searched for the desired color code. This search yields the existing color code with the closest color code less than the desired color code. (Caching and first checking the color code from the immediately previous or neighboring 16-pixel block can often improve performance.)

3. If the color code of the 16-pixel block in question matches a color code already in the AVL tree, the index number (from list 102) corresponding to the already-existing color code is returned.

4. If the match is not exact, the M previous color codes and M following color codes (where M is on the order of 4) in the tree 104 (i.e., when the two-color color codes are in numerical order) are examined to find the closest match to the desired color pair. As a practical matter, the numerically closest color code value may not be necessarily the closest color visually. One might, for example, consider a color where both the red and blue components differ in their least significant bit from the desired color code to be worse than a color that differs only in the least significant bit of the green component, although the second case would have the larger absolute difference in code values.

5. Having found the closest color code for some range of entries 2×M+1, the closest color code is checked to see if it lies within a predetermined tolerance value. If the closest color code is within the predetermined tolerance, the index number (from list 102) for that color code already in the AVL tree is returned.

6. If no color code is found in the color table within the predetermined tolerance, then the newly-derived color code is added to the color table.

As mentioned above, the overall compression system as described in FIG. 1 finds utility in situations, such as in low-end printing systems, where there is a practical limit on the number of color pairs that can be retained in a memory and called forth as needed to print an image. It is an important function of the present invention to manage the size of a color table 100 (that is, the absolute number of two-color color codes retained therein at a given time) so that the population of color codes in color table 100 stays at a manageable level from the standpoint of the speed of retrieval of a particular desired color code. Therefore, according to one aspect of the present invention, algorithms are used for culling color codes from color table 100, basically so that color codes describing color pairs which are deemed unnecessary can be removed from tree 104. This process of repeatedly pruning the AVL tree 104 in the course of compressing an image is here generally referred to as "consolidation."

A system for consolidation should be distinguished from the abovedescribed system of providing "tolerances" for determining whether to create a new color code for the AVL tree or using a code which has already been created. The above-described system of tolerances is adequate for most typical documents, and will still give the closest color pair available within an AVL tree, and not just some color within a given tolerance. However, in certain "stressful" documents, such as images of color photographs, there will be so many color codes generated that color codes will fall into the tolerances of one another as the tolerance is relaxed. Consolidation is another approach to control the population of the color table to free space for more important color codes.

One important task that can be performed to reduce the size of the color table is to consider the image in the frame buffer and determine whether there are any portions of the image that have been created by the page description language, but do not appear in the final image. For example, it is not unusual, in graphics utilities, for a geometric figure to be mathematically "drawn" (i.e. described) but then covered up by another geometric figure (such as in subsequent editing), so that the first geometric figure does not appear in the final printed image. In such a case, there may be an opportunity to delete color codes for color-pairs which are not apparent in the final printed image.

Beyond identifying superfluous color codes, the basic steps of consolidating the color table are as follows:

First, color codes are identified for color pairs that can be collapsed into a single color, because the two colors described in the two-color color code are themselves sufficiently close to each other. To do this, the AVL tree 104 is traversed, and all of the color codes are examined. If the two colors described in each color code are sufficiently close to each other within a predetermined tolerance, they can be combined into a code describing a single color. According, for example, to the patents incorporated above by reference, codes describing a single color can be handled by a completely different method than the presently-described system for handling 16-pixel blocks holding two colors, and therefore 16-pixel blocks which describe only one color are effectively taken out of the system; therefore any color code describing two very close colors is not needed in the tree 104. These codes are not immediately removed, but rather marked for deletion. It will be noted that the above-described system for creating color codes with interleaved bits is readily conducive to a system for comparing the two colors described in the interleaved bit, such as by, for example, subtracting the odd-number-place bits (describing one color) from the even-number-place bits (describing the other color).

The next step of the consolidation method is to consolidate color codes describing color pairs within a predetermined tolerance from similar color pairs. To do this, the AVL tree 104 is traversed in numerical order, with a first color code taken as the "base entry" and the following color code being considered the "current entry." The base entry and the current entry are compared, and if they are within the predetermined tolerance, the current entry is replaced with a pointer to the base entry. The set of colors for color pairs found to lie within the tolerance of the base entry are averaged and this average replaces the base entry colors.

Two color codes that are deemed sufficiently close that they may be consolidated as one color code can be "averaged" in different ways. Straightforwardly, the two color codes can simply be averaged as single binary numbers; alternately, the binary numbers for the individual stimuli (such as red, green, or blue) can be separated out of the two color codes, each pair of samecolor stimuli averaged separately, and the averaged stimuli re-interleaved to form the "average" color code.

In consolidation, after the above steps of removing single-color entries and averaging close color pairs is performed, the original image in the page image buffer is updated. Referring again to the original image, each 16-pixel block is examined to see if it refers to the newly-consolidated color table; if so, the color code is examined. If the color table entry is marked as a single color, the 16-pixel block in the original image is re-encoded under the single-color scheme, such as described in the patent referenced above. If the color table entry is marked as from a "combined" color code, the pointer to the base entry (as described above) is retrieved and the base entry is employed in the 16-pixel block. The base entry thus found is marked as a "needed" entry.

Following update of the original image in the page image buffer, the AVL tree 104 is traversed a final time and nodes that refer to entries that have not been marked as "needed" in the previous step are deleted from the AVL tree.

The various consolidation routines generally described herein can be performed either continuously, or only when the size of tree 104 is detected to be over a certain capacity.

While the invention has been described with reference to the structure disclosed, it is not confined to the details set forth, but is intended to cover such modifications or changes as may come within the scope of the following claims.

We claim:

1. A method of managing a list of color codes, each color code comprising information relating to the plurality of color stimuli for at least one selectable color, in an apparatus for displaying a plurality of selectable colors, each selectable color comprising a plurality of color stimuli, comprising the steps of:

obtaining a plurality of stimuli describing at least a first color, each of said stimuli in the form of a binary number;

arranging the binary numbers of said plurality of stimuli so that digits of equal significance for the plurality of stimuli are grouped together, thereby creating a single binary number forming a color code; and retaining the color code in numerical order relative to other color codes.

2. The method of claim 1, the retaining step comprising entering the color code into a threaded tree data structure.

3. The method of claim 2, further comprising the step of assigning an index number to each color code in the tree data structure.

4. The method of claim 2, further comprising the step of searching the tree data structure to identify a color closest to a desired color.

5. The method of claim 1, further comprising the steps of entering a first color code and a second color code into a tree data structure; and if the first color code in the tree data structure is within a predetermined numerical tolerance of the second color code in the tree data structure, consolidating the first color code and the second color code to a single color code.

6. The method of claim 5, the consolidating step including averaging the first color code and the second color code, and replacing the first color code and second color code with an average color code.

7. The method of claim 1, further comprising the steps of:

obtaining a plurality of stimuli describing a second color, each of said stimuli in the form of a binary number;

arranging the binary numbers of the plurality of stimuli describing the second color in the color code, whereby digits of equal significance for the plurality of stimuli of the first and second color are grouped together.

8. The method of claim 7, further comprising the steps of for a color code, comparing a set of bits describing the first color with the set of bits describing the second color; and if the set of bits describing the first color is within a predetermined tolerance of a the set of bits describing the second color, removing the color code from the tree data structure.

9. A method of managing a color table, the color table comprising a plurality of color codes, each color code including information relating to a plurality of stimuli describing at least two colors, comprising the steps of:

creating a plurality of color codes, the creating step for each color code including the steps of obtaining a plurality of stimuli describing a first color, each of said stimuli in the form of a binary number, obtaining a plurality of stimuli describing a second color, each of said stimuli in the form of a binary number, and combining the stimuli describing the first color with the stimuli describing the second color, to obtain a single orderable number forming the color code; and retaining the color codes in numerical order in the color table.

10. The method of claim 9, the combining step for each color code including concatenating at least a subset of binary digits of a stimulus related to the first color with at least a subset of binary digits of a stimulus related to the second color.

11. The method of claim 9, the combining step for each color code including, for each of the first color and the second color, calculating a weighted value of the plurality of stimuli.

12. The method of claim 9, the combining step for each color code including interleaving at least a subset of binary digits of a stimulus describing the first color with at least a subset of binary digits of a stimulus describing the second color.

13. The method of claim 9, the combining step for each color code including arranging the binary numbers describing to the first color and the second color whereby binary digits of equal significance for the stimuli describing the first color and the stimuli describing the second color are grouped together.

14. The method of claim 9, further comprising the step of retaining the color codes in a tree structure.

15. The method of claim 14, further comprising the step of assigning an index number to each color code in the tree structure.

16. The method of claim 14, further comprising the step of if a first color code in the tree data structure is within a numerical tolerance of a second color code in the color table, consolidating the first color code and the second color code to a single color code.

17. The method of claim 16, the consolidating step including averaging the first color code and the second color code, and replacing the first color code and second color code with an average color code.

18. The method of claim 9, further comprising the step of searching the color table to identify a color in the color table closest to a desired color.

19. The method of claim 9, further comprising the steps of for a color code, comparing the bits describing the first color with the bits describing the second color; and if the bits describing the first color define a number within a predetermined tolerance of a number defined by the bits describing the second color, removing the color code from the color table.

* * * * *